(12) United States Patent
Budmiger et al.

(10) Patent No.: US 8,042,410 B2
(45) Date of Patent: Oct. 25, 2011

(54) MAGNETO-INDUCTIVE FLOW MEASURING DEVICE

(75) Inventors: Thomas Budmiger, Ettingen (CH); Georg Szaloky, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 35 days.

(21) Appl. No.: 12/227,486

(22) PCT Filed: May 16, 2007

(86) PCT No.: PCT/EP2007/054792
§ 371 (c)(1),
(2), (4) Date: May 20, 2009

(87) PCT Pub. No.: WO2007/135075
PCT Pub. Date: Nov. 29, 2007

(65) Prior Publication Data
US 2009/0301218 A1    Dec. 10, 2009

(30) Foreign Application Priority Data
May 19, 2006   (DE) .......................... 10 2006 023 916

(51) Int. Cl.
*G01F 1/58* (2006.01)
(52) U.S. Cl. .................................................. 73/861.12
(58) Field of Classification Search .. 73/861.12–861.17; 324/350
See application file for complete search history.

(56) References Cited

U.S. PATENT DOCUMENTS

| 3,786,680 | A | | 1/1974 | Wyatt |
| 4,296,636 | A | | 10/1981 | Mannherz |
| 4,312,231 | A | * | 1/1982 | Kawashima et al. ........... 73/643 |
| 4,565,619 | A | | 1/1986 | Gardner et al. |
| 5,041,792 | A | * | 8/1991 | Thompson ..................... 324/350 |
| 7,383,739 | B2 | * | 6/2008 | Hofmann .................... 73/861.12 |
| 7,540,202 | B2 | * | 6/2009 | Bier ........................... 73/861.12 |

FOREIGN PATENT DOCUMENTS

| DE | 33 29 899 | 3/1985 |
| DE | 41 05 311 | 8/1992 |
| DE | 196 03 093 | 7/1997 |
| DE | 197 22 977 | 2/1999 |
| DE | 100 49 781 | 4/2002 |
| DE | 10 2005 019 418 | 11/2006 |

(Continued)

OTHER PUBLICATIONS

P.P. Kremlevsky, "Flowmeters and Quantity Meters", Handbook $4^{th}$ Ed., 1989.

*Primary Examiner* — Jewel V Thompson
(74) *Attorney, Agent, or Firm* — Bacon & Thomas, PLLC

(57) ABSTRACT

An apparatus for measuring volume- or mass-flow of a medium flowing through a measuring tube in the direction of the measuring tube axis, and includes: a magnet system, which produces a magnetic field passing through the measuring tube essentially transversely to the measuring tube axis; at least one measuring electrode, which contacts the medium in a defined surface region; and a control/evaluation unit, which provides information concerning volume- or mass flow of the medium in the measuring tube on the basis of a measurement voltage induced in the at least one measuring electrode. At least the medium-contacting surface region of the at least one measuring electrode is manufactured of a chemically inert and electrochemically and mechanically resistant material.

5 Claims, 2 Drawing Sheets

FOREIGN PATENT DOCUMENTS

| | | |
|---|---|---|
| EP | 0 488 754 | 6/1992 |
| EP | 1 036 861 | 9/2000 |
| EP | 1 431 716 | 6/2004 |
| EP | 1 630 257 | 3/2006 |
| EP | 1 731 881 | 12/2006 |
| GB | 2 252 670 | 8/1992 |
| GB | 2 404 738 | 2/2005 |
| JP | 2002-131101 | 5/2002 |

* cited by examiner

MAGNETO-INDUCTIVE FLOW MEASURING DEVICE

TECHNICAL FIELD

The invention relates to a magnetically inductive flow measuring device, thus, an apparatus for measurement of volume- or mass-flow, e.g. flow rate, of a medium flowing through a measuring tube in the direction of the measuring tube axis. The apparatus includes: A magnet system, which produces a magnetic field passing through the measuring tube essentially transversely to the measuring tube axis; at least one measuring electrode, which is in contact with the medium in a defined surface region; and a control/evaluation unit, which provides information concerning the volume- or mass-flow of the medium in the measuring tube on the basis of a measurement voltage induced in the at least one measuring electrode.

BACKGROUND DISCUSSION

Magneto-inductive flow measuring devices utilize the principle of electrodynamic induction for volumetric flow measurement: charge carriers of the medium moved perpendicularly to a magnetic field induce a measurement voltage in measuring electrodes likewise arranged essentially perpendicularly to the flow direction of the medium. The measurement voltage induced in the measuring electrodes is proportional to the flow velocity of the medium averaged over the cross section of the measuring tube; it is, thus, proportional to volume flow. The measurement voltage is usually tapped via a measuring electrode pair, which is arranged in the region of maximum magnetic field strength, where, thus, the maximum measurement voltage is to be expected. The measuring electrodes are coupled with the medium either galvanically or capacitively.

In the case of application of medium-contacting, measuring electrodes, there form, at the interface between the metal measuring electrode and the medium flowing through the measuring tube, galvanic elements, which cause an electrochemical disturbance potential. This electrochemical disturbance potential varies over time, since it depends on different, changing, environmental conditions, such as temperature, pressure, composition of the medium, material of the measuring electrodes and material of the measuring tube. Thus, for example, the composition of the surface of the measuring electrodes can change as a result of formation of a passivating layer or as a result of corrosion. The varying electrochemical disturbance potential superimposes itself on the actual measurement voltage proportional to the flow velocity of the medium flowing through the measuring tube. It is clear, that an electrochemical potential changing as a function of time influences negatively the accuracy of measurement of a conventional, magnetically inductive, flow measuring device. Methods are, therefore, needed, which eliminate these disturbance signals. It is especially critical, when the medium to be measured is a medium having a small electrical conductivity flowing through the measuring tube with a relatively high flow velocity. Due to the influence of the relatively large disturbance voltage on the measurement voltage, there is then the danger, that the measurement voltage will disappear in the noise, whereby a reliable and repeatable, flow measurement becomes impossible.

SUMMARY OF THE INVENTION

An object of the invention is to provide a magnetically inductive, flow measuring device, whose accuracy of measurement is largely uninfluenced by electrochemical disturbance potentials.

The object is achieved by manufacturing at least the medium-contacting surface region of the at least one measuring electrode of a chemically inert and mechanically resistant material. In a preferred embodiment of the apparatus of the invention, the chemically inert and electrochemically and mechanically resistant material is diamond made electrically conductive via suitable doping. Especially, the diamond material for this purpose is boron-doped.

A sensor having microelectrodes of diamond is disclosed in WO 2005/017514. The sensor, there, serves for determining a chemical property, or a chemical process variable, of a liquid. Especially, the sensor includes a housing, an insulating layer of a non-conductive, diamond-material, a large number of microelectrodes of a conductive, diamond material, and a circuit, which is connected with each of the micro-electrodes. On the basis of the measurement signals sensed by the microelectrodes, the chemical process, variable of interest for the medium is determined. Especially, the microelectrodes are arranged in a regular or irregular pattern. Preferably, they are so integrated in the insulating, diamond material, that they contact the medium, directly or indirectly.

As described in the state of the art, also a synthetically manufactured diamond can be applied in connection with the present invention. Diamond has, on the one hand, a high hardness and, thus, a high mechanical and electrochemical resistance; on the other hand, diamond has the advantage, that it is largely chemically inert. Therewith, the problem occurring in the case of conventional, magnetically inductive, flow measuring devices, that there is superimposed, on the actual measurement signals at the measuring electrodes, a time-varying, disturbance signal brought about by changeable, electrochemical disturbance potentials on the measuring electrodes, is eliminated. The flow measuring device of the invention is distinguished by an optimized signal/noise ratio. Therewith, it becomes possible, with the flow measuring device of the invention, to determine, with a sufficiently high reproducibility and accuracy of measurement, even low flow velocities of a medium of small conductivity. With reference to usual media and usual flow velocities, thus, an increased accuracy of measurement is achieved. For example, for achieving a desired accuracy of measurement in known flow measuring devices, a lowered magnetic field can be worked with, which leads to considerable energy savings in measurement operation. Beyond that, measuring electrodes manufactured of diamond have the advantage that they can be employed over long periods of time and are extremely low-maintenance.

In an advantageous, further development of the apparatus of the invention, the magnet system includes two diametrally arranged, electromagnets, wherein the control/evaluation unit so operates the electromagnets, that they produce a periodically alternating, or a constant, magnetic field in the measuring tube.

In the case of known, magnetically inductive, flow measuring devices with usual measuring electrodes, the polarity of the magnetic field periodically changes. By forming the difference between two, succeeding, measured values ascertained at different polarities of the magnetic field, signal portions representing the disturbance variables and, thus, not reflecting the volume- or mass-flow to be ascertained, can be effectively eliminated. Of course, this embodiment with periodically reversing magnetic field can also be applied in connection with the present solution, although the disturbing influences, as already mentioned above, are approximately removed in the case of the solution of the invention. Less complex solutions, especially a flow measuring device with a constant magnetic field, can, therefore, be applied in connection with the invention.

In an embodiment, an option is to produce the constant magnetic field using electromagnets. Especially advantageous in connection with the flow measuring device of the invention is to form the magnet system on the basis of at least one permanent magnet, which produces a constant magnetic field in the interior of the measuring tube. This solution is, on the one hand, very energy-saving; on the other hand, a constant magnetic field passing through the measuring tube opens the possibility of measuring the volume- or mass-flow continuously and not only during a measuring-device-dependent, measuring period following a switching of the polarity of the magnetic field. This situation is treated in greater detail below.

Especially, in connection with a constant magnetic field produced via at least one permanent magnet, an advantageous embodiment of the invention provides an energy supply unit, which supplies the energy required for operating the flow measuring device. For example, the energy supply unit is a battery, a solar cell or a fuel cell. Preferably, the energy supply unit is integrated in the measurement transmitter, or the control/evaluating unit, of the magnetically inductive, flow measuring device.

BRIEF DESCRIPTION OF THE DRAWINGS

The invention will now be explained in greater detail on the basis of the appended drawing, the figures of which show as follows.

DETAILED DISCUSSION

Figure 1:
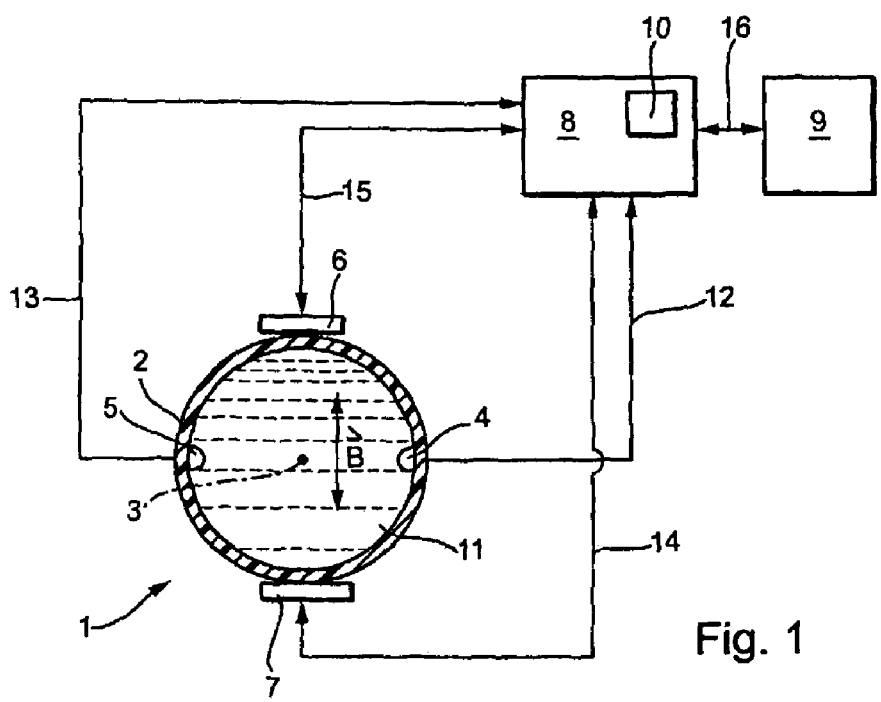
FIG. 1 a schematic drawing of a first embodiment of the apparatus of the invention.

FIG. 1 shows a schematic drawing of a first embodiment of the apparatus of the invention. Medium 11 flows through the measuring tube 2 in the direction of the measuring tube axis 3. The medium 11 is at least slightly electrically conductive. The measuring tube 2 itself is made of a non-conductive material, or, at least its inner surface is lined with a non-conductive material.

The magnetic field B directed perpendicularly to the flow direction of the medium 11 is produced via the two, diametrally arranged, electromagnets 6, 7. The magnetic field B is either a constant magnetic field or an alternating magnetic field periodically reversing its direction. Under the influence of the magnetic field B, charge carriers located in the medium 11 migrate, according to their polarity, to one of the two oppositely poled, measuring electrodes 4, 5. The voltage established between the measuring electrodes 4, 5 is proportional to the flow velocity of the medium 11 averaged over the cross section of the measuring tube 2, i.e. it is a measure for the volume flow rate of the medium 11 in the measuring tube 2. Measuring tube 2 is connected via connecting elements, e.g. flanges (not specially shown in the drawing), with a pipe system, through which the medium 11 flows.

The measuring electrodes 4, 5 are, in the illustrated example, in direct contact with the medium 11. According to the invention, at least the medium-contacting, surface regions of the measuring electrodes 4, 5 are manufactured of diamond containing a suitably conductive doping. Preferably, the medium-contacting surface region of each measuring electrode 6; 7 is boron-doped diamond.

Via connecting lines 12, 13, the measuring electrodes 4, 5 are connected with the control/evaluation unit 8. Connection between the electromagnets 6, 7 and the control/evaluation unit 8 is accomplished via the connecting lines 14, 15. The control/evaluation unit 8 is connected via the connecting line 16 with an input/output unit 9 and, on occasion, via a data bus with a superordinated control room. Of course, communication can also occur per radio. The evaluating/control unit 8 is additionally provided with the memory unit 10.

Figure 2:
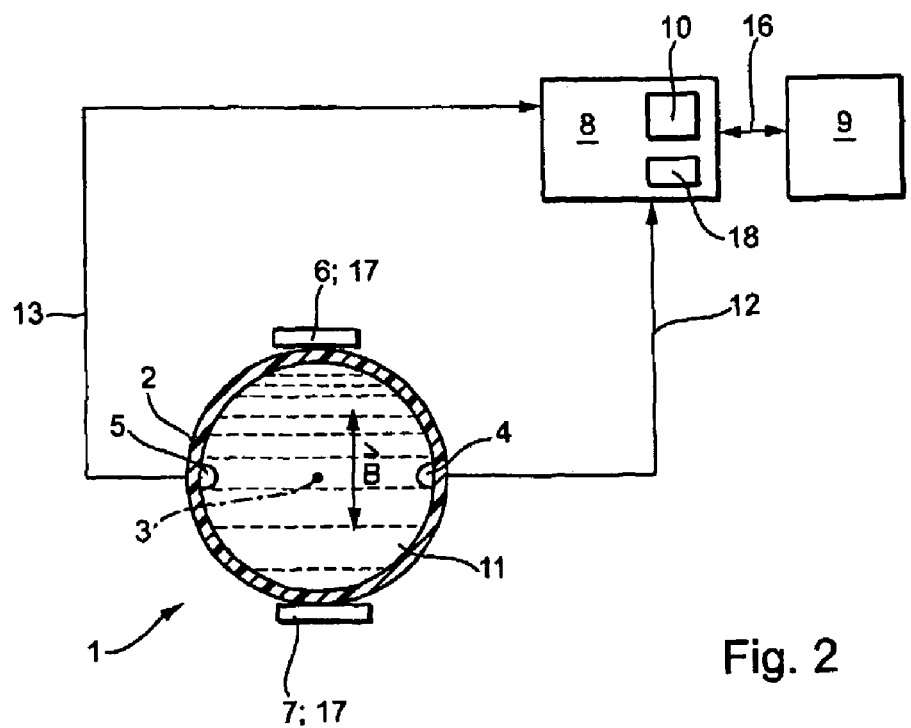
FIG. 2 a schematic drawing of a second form of embodiment of the apparatus of the invention.

FIG. 2 shows a schematic drawing of a second form of embodiment of the apparatus of the invention. An essential difference between the two forms of embodiment lies in the magnet system used: While, in the case of the embodiment of FIG. 1, electromagnets 6, 7 are applied, in the case of the embodiment of FIG. 2, permanent magnets 17 are used. In both cases, the magnet system is so embodied and/or arranged, that the electromagnets 6, 7 or the permanent magnets 17 produce a largely homogeneous magnetic field B over the cross section of the measuring tube 2.

With the solution described in FIG. 1, with periodically alternating, magnetic field, only a discontinuous measuring of the volume- or mass-flow is possible. This comes from the fact that, in the case of switching of the magnetic field B, only in the ideal case does the electrical current curve in the coils of the electromagnets 6, 7 follow the course of the magnetic field B. Due to eddy currents, which arise in the pole shoes and cores of the electromagnets 6, 7 during the reversing of the magnetic field B, in the real case, deviations from this ideal case occur. The coil current measured outside of the coils always corresponds to the sum of the electrical current flowing in the coils and the electrical current produced by the eddy-current. If the current measured outside of the coils is used as control variable, then, indeed, the current is constant, not, however, the magnetic field B. This is true always until the eddy-currents have decayed. Only then can a reliable measuring of the volume- or mass-flow be performed. The assignee has disclosed a number of methods, which serve to reduce the time span following switching of the magnetic field B not suitable for the measuring, in order to increase the subsequent measuring time. Corresponding electromagnetic flow measuring devices are available from the assignee under the designation PROMAG.

An advantage of the embodiment illustrated in FIG. 2 with constant magnetic field B is that, in such case, a continuous measuring of the volume- or mass-flow is possible. The time period, after switching of the magnetic field, not available for the measuring is omitted, and the measuring time can be chosen to be as long as desired. Especially, it is so optimized, that a desired accuracy of measurement is achieved. Due to the optimizable measuring period, best measurement results can be achieved with the apparatus of the invention. Of course, a constant magnetic field can also be produced via the electromagnets 6, 7.

Since the switching of the polarity of the magnetic field is omitted in the case of the solution with permanent-magnets, it is additionally possible, in simple manner, to provide a self-sufficient, flow measuring device 1. Thus, in the illustrated case, an energy supply unit 18 is integrated directly into the control/evaluation unit 8. The energy supply unit 18 is, preferably, a battery, a fuel cell or even, in the right circumstances, a solar cell.

LIST OF REFERENCE CHARACTERS 1 magnetically inductive, flow measuring device
2 measuring tube
3 measuring tube axis
4 diamond-coated measuring electrode
5 diamond-coated measuring electrode
6 electromagnet
7 electromagnet
8 control/evaluation unit
9 input/output unit
10 memory unit
11 medium
12 connecting line
13 connecting line
14 connecting line
15 connecting line
16 connecting line
17 permanent magnet
18 energy supply unit

The invention claimed is:

1. An apparatus for measuring volume- or mass-flow of a medium flowing through a measuring tube in the direction the measuring tube axis, comprising:
   a magnet system, which produces a magnetic field passing through the measuring tube essentially transversely to the measuring tube axis;
   at least one measuring electrode, which contacts the medium in a defined surface region; and
   a control/evaluation unit, which provides information concerning volume- or mass-flow of the medium in the measuring tube on the basis of a measurement voltage induced in said at least one measuring electrode),
   wherein:
   at least a medium-contacting surface region of said at least one measuring electrode comprises a chemically inert and electrochemically and mechanically resistant material;
   said magnet system comprises at least one permanent magnet; and
   said chemically inert and electrochemically and mechanically resistant material is diamond doped to be electrically conductive.

2. The apparatus as claimed in claim 1, wherein:
said chemically inert and electrochemically and mechanically resistant material is boron-doped diamond.

3. The apparatus as claimed in claim 1, wherein:
said magnet system comprises two diametrally arranged electromagnets; and
said control/evaluation unit so operates said electromagnets, that it produces a periodically alternating, or a constant, magnetic field in the measuring tube.

4. The apparatus as claimed in claim 1, further comprising:
an energy supply unit, which supplies energy required for operating the flow measuring apparatus.

5. The apparatus as claimed in claim 4, wherein:
said energy supply unit comprises one of: a battery, a solar cell or a fuel cell.

* * * * *